UNITED STATES PATENT OFFICE.

FRANK K. CAMERON, OF WASHINGTON, DISTRICT OF COLUMBIA.

PROCESS OF TREATING PHOSPHORIC-ACID SOLUTIONS.

1,276,870.   Specification of Letters Patent.   Patented Aug. 27, 1918.

No Drawing.   Application filed November 11, 1916.   Serial No. 130,858.

*To all whom it may concern:*

Be it known that I, FRANK K. CAMERON, a citizen of the United States, residing at Washington, in the District of Columbia, have invented certain new and useful Improvements in Processes of Treating Phosphoric-Acid Solutions, of which the following is a specification.

This invention is a process of treating phosphoric acid solutions, whereby substantially the entire phosphoric acid content thereof may be recovered in the form of certain valuable combinations with ammonia. The process may be carried out as follows:—

Phosphoric acid solutions derived from any source but in excess of a certain minimum concentration, are treated with gaseous ammonia, $NH_3$, the supply of ammonia being continued not only to complete neutralization of the phosphoric acid, but to practical saturation, at the pressure and temperature employed, of the liquid. Under these conditions I have found that tri-ammonium-phosphate is formed and is precipitated practically quantitatively.

The reaction succeeds with phosphoric acid solutions of all concentrations in excess of 12 to 13 per cent. $P_2O_5$, such solutions being herein referred to as "strong solutions". With solutions of materially lower concentrations than this the same results are not attainable, at least at normal pressures and temperatures.

The reaction is facilitated and rendered even more complete by the use of pressures in excess of atmospheric. For this purpose superatmospheric pressures of one to five pounds will suffice, although higher pressures may of course be used. The effect of such increased pressures is presumably to increase the concentration of ammonia in the solution, and thereby to accelerate and render more complete the formation and precipitation of the tri-ammonium-phosphate.

At the close of the operation, the tri-ammonium-phosphate is separated from the liquid, from which the excess ammonia may be recovered in any suitable way for use in subsequent operations. The addition of small proportions of lime to the liquid followed by boiling is an aid in effecting the complete recovery of the residual ammonia.

The tri-ammonium-phosphate is an unstable compound which gives off ammonia on standing. By gentle heating I am able to convert it into the relatively stable mono- and di-ammonium phosphates, or into mixtures of these salts, which are directly utilizable. The ammonia evolved during the heating of the solid salt is recovered and is again utilizable in the process.

I claim:—

1. Process of effecting a substantially complete precipitation of phosphoric acid from strong solutions thereof, comprising bringing gaseous ammonia into presence of an aqueous solution containing not less than twelve per cent. of phosphoric acid, the ammonia being in sufficient excess to effect a substantially complete precipitation of the phosphoric acid in the form of tri-ammonium phosphate.

2. Process of treating strong phosphoric acid solutions, which consists in reacting thereon under superatmospheric pressure with gaseous ammonia in sufficient excess to precipitate substantially the whole of the phosphoric acid as tri-ammonium-phosphate.

3. Process of effecting a substantially complete precipitation of phosphoric acid from strong solutions thereof, comprising bringing gaseous ammonia into presence of an aqueous solution containing not less than twelve per cent. of phosphoric acid, the ammonia being in sufficient excess to effect a substantially complete precipitation of the phosphoric acid in the form of tri-ammonium phosphate, and subsequently recovering a portion of the ammonia by converting the tri-ammonium phosphate into an ammonium-phosphoric acid compound or mixture containing a lesser proportion of ammonia.

4. Process of treating strong phosphoric acid solutions, which consists in reacting thereon under superatmospheric pressure with gaseous ammonia in sufficient excess to precipitate substantially the whole of the phosphoric acid as tri-ammonium-phosphate, and subsequently recovering a portion of the ammonia by converting the tri-ammonium phosphate into an ammonium-phosphoric acid compound or mixture containing a lesser proportion of ammonia.

In testimony whereof I affix my signature in presence of a witness.

FRANK K. CAMERON.

Witness:
JOHN H. SIGGERS.